United States Patent [19]
Kerr

[11] Patent Number: 5,992,675
[45] Date of Patent: Nov. 30, 1999

[54] SPLATTER SCREEN

[76] Inventor: Helen Kerr, Toronto, Canada

[21] Appl. No.: 09/153,594

[22] Filed: Sep. 15, 1998

[51] Int. Cl.[6] ........................................................ A47J 36/06
[52] U.S. Cl. ............................................ 220/370; 220/912
[58] Field of Search ..................................... 220/369–373, 220/379, 744, 730, 731, 212, 912, 573.1

[56] References Cited

U.S. PATENT DOCUMENTS

| | | |
|---|---|---|
| D. 302,637 | 8/1989 | Hiscott et al. . |
| 1,055,072 | 3/1913 | Pearl .................................... 220/912 X |
| 2,498,534 | 2/1950 | Drum ....................................... 220/370 |
| 2,664,169 | 12/1953 | Misener et al. ...................... 220/369 X |
| 3,173,568 | 3/1965 | Magnuson ............................... 220/372 |
| 3,452,895 | 7/1969 | Kalkowski .............................. 220/370 |
| 3,809,281 | 5/1974 | Kalkowski . |
| 4,108,332 | 8/1978 | Thompson ............................... 220/370 |

*Primary Examiner*—Stephen K. Cronin
*Assistant Examiner*—Nathan Newhouse
*Attorney, Agent, or Firm*—Swabey Ogilvy Renault

[57] ABSTRACT

A cover or splatter screen for a cooking vessel which in use rests atop the cooking vessel to prevent splashing of hot liquid, especially fatty liquid from the vessel during cooking, while permitting passage of water vapor and steam from the cooking vessel; the cover has a support frame and a wire mesh screen extending between opposed sides of the frame and a plurality of support legs in spaced apart relationship extending outwardly of the support frame and downwardly of the wire mesh screen; the support legs support the cover in a free-standing configuration on a flat supporting surface with the wire mesh screen spaced from the flat supporting surface; typically the flat supporting surface is a kitchen working surface, and thus the cover may be supported on the kitchen working surface with the wire mesh screen in non-contacting relationship with the kitchen working surface, whereby soiling of the kitchen working surface by fats retained by the wire mesh screen during working is avoided.

10 Claims, 1 Drawing Sheet

SPLATTER SCREEN

BACKGROUND OF THE INVENTION i) Field of the Invention

This invention relates to a cover having a wire mesh screen, for a cooking vessel, and in particular a splatter screen.

ii) Description of Prior Art

Splatter screens are known which comprise a generally planar wire mesh screen housed in a frame. The screen is placed over the opening of a cooking vessel, during the cooking operation; the mesh openings in the screen are dimensioned such as to prevent passage of particles of hot liquid, such as hot liquid fat sprayed upwardly when frying or cooking food stuff containing water and fat, while permitting passage of vapors such as water vapor and steam.

Such splatter screens are of a generally planar configuration, and the mesh screen is of a significant area. When the splatter screen is removed from the cooking vessel either temporarily during the cooking operation, or at the termination of the cooking operation, it is typically placed on an adjacent available working surface available to the cook in the kitchen.

The kitchen working surface which temporarily supports the splatter screen during the cooking operation, or at the termination of the cooking operation and prior to washing, becomes soiled with fatty oil or grease retained by the wire mesh which engages the kitchen working surface. This is undesirable in that it results in a soiled kitchen working surface, thereby reducing the kitchen working surface available and also in that it necessitates cleaning of both the splatter screen and the working surface.

SUMMARY OF THE INVENTION

It is an object of this invention to provide a cover or splatter screen having a mesh screen and support legs which will support the cover in a free-standing configuration on a flat supporting surface with the mesh screen spaced from the flat supporting surface.

In accordance with the invention, there is provided a cover adapted to rest loosely atop a cooking vessel to prevent splashing of hot liquids from the vessel, while allowing passage of vapors from the vessel during cooking, comprising:

a cover member having an upper face and a lower face and comprising a support frame and a generally planar wire mesh screen extending between opposed sides of said support frame, said mesh screen being adapted to extend across an opening of a cooking vessel to intercept hot liquid splashing outwardly therefrom, while allowing passage of vapor, a plurality of support legs in spaced apart relationship extending outwardly of said support frame and downwardly of said lower face, said support legs being adapted to support said cover member, in a free-standing configuration, on a flat supporting surface, with said lower face spaced from the flat supporting surface.

DESCRIPTION OF PREFERRED EMBODIMENTS

In a preferred embodiment, the support frame of the cover is substantially circular, and a handle member extends outwardly of the support frame.

The support legs have leg support surfaces adapted to engage a flat supporting surface such as a kitchen working surface, in the free-standing configuration, when the cover is not atop the cooking vessel. These leg support surfaces lie in a common place spaced from the wire mesh screen, so as to securely locate the wire mesh screen and retained fat residue, spaced apart from and in non-contacting relationship with the kitchen working surface. Preferably the handle has an outer end having a handle support surface, said handle support surface lying in the common plane which contains the leg support surfaces; in this way, the handle functions as an additional leg and assists in supporting the cover in the free-standing configuration. In this latter embodiment, the handle is suitably elongate, extending outwardly from the support frame and disposed at an acute angle to the aforementioned common plane.

Suitably there may be four support legs disposed in a symmetrical manner about the cover member, in said spaced apart relationship.

The support legs are conveniently arcuately curved to permit restrained lateral movement of the cover member relative to the opening of the cooking vessel on which the cover rests.

By "restrained lateral movement" is meant that the legs do not firmly engage the side walls of the cooking vessel such that no lateral movement of the cover would be possible, but rather the legs are fashioned to stably locate or seat the cover atop the cooking vessel, with freedom to move laterally. This is particularly achieved by the arcuate curvation of the support legs.

In known manner, the wire mesh screen should have mesh openings dimensioned to intercept or prevent passage of hot liquids, for example, liquid fat splashing upwardly and outwardly of the interior of the cooking vessel, while allowing passage of vapors, for example, water vapor and steam.

The mesh openings also permit visual inspection of the food-stuff cooking in the vessel, and by allowing escape of steam and water vapor prevent undesirable pressure build-up in the cooking vessel.

DESCRIPTION OF PREFERRED EMBODIMENTS WITH REFERENCE TO THE DRAWINGS

Figure 1:
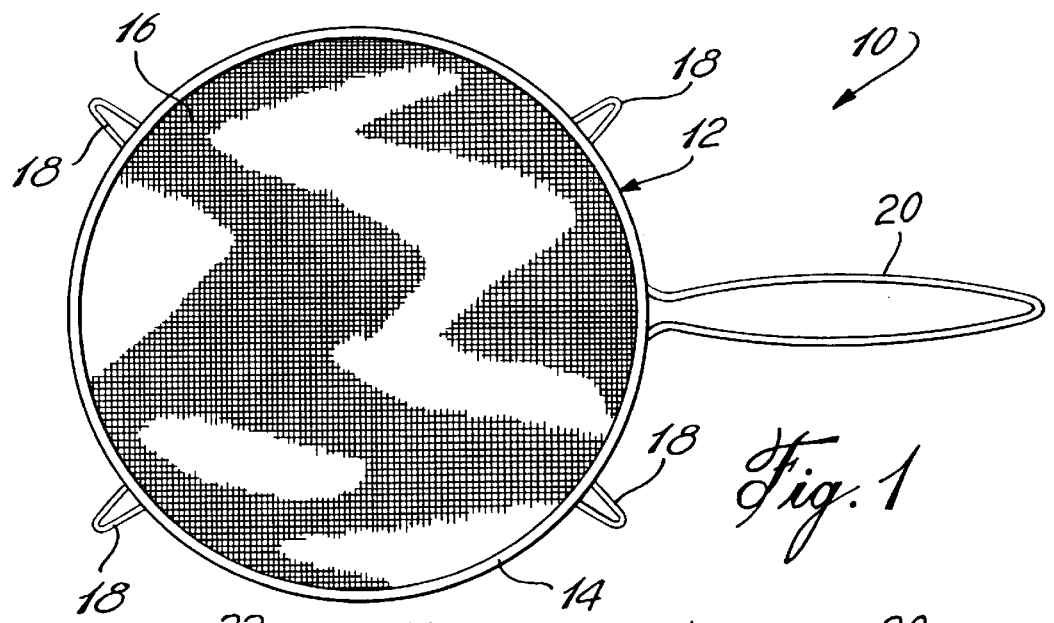
FIG. 1 is a plan view of a splatter screen of the invention.
Figure 2:
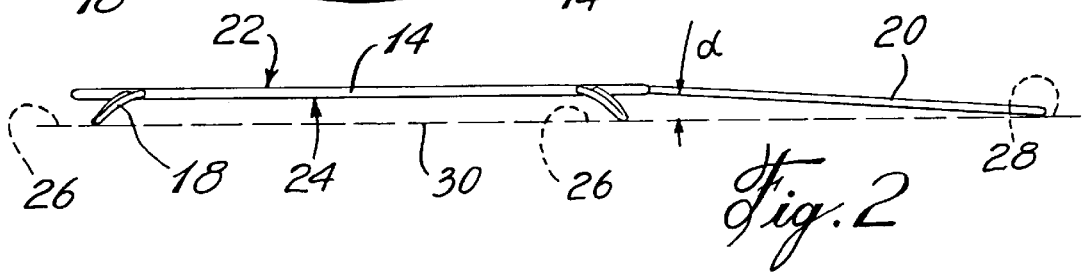
FIG. 2 is a side elevation of the splatter screen of FIG. 1.

With further reference to FIGS. 1 and 2, a splatter screen 10 comprises a cover member 12 having a circular support frame 14 and a wire mesh screen 16 extending between opposed sides of frame 14.

Four support legs 18 extend outwardly of circular support frame 14 and handle 20 extends outwardly of circular support frame 14.

Splatter screen 10 has an upper face 22 and a lower face 24 in opposed relationship with upper face 22.

The support legs 18 extend downwardly of lower face 24 and terminate at leg support surfaces 26. Similarly, handle 20 extends downwardly of lower face 24 and terminates in a handle support surface 28. The leg support surfaces 26 and the handle support surface 28 all lie in a common plane 30, and handle 20 is inclined at an acute angle alpha to common plane 30.

The support legs 18 as shown are symmetrically disposed about frame 14 relative to handle 20.

Figure 4:
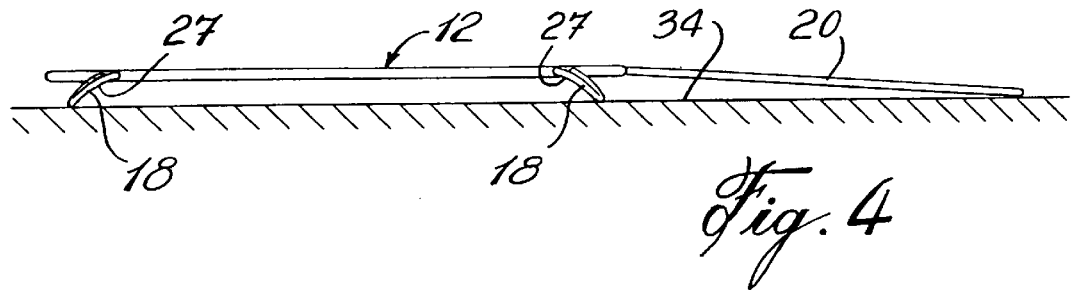

As more particularly shown in FIG. 4, the leg support surfaces 26 and handle support surface 28 function to support a splatter screen 10 in a free standing configuration on a flat working surface such as kitchen working surface 34.

Each of support legs 18 has an arcuate or concavely curved inner face 27.

Figure 3:
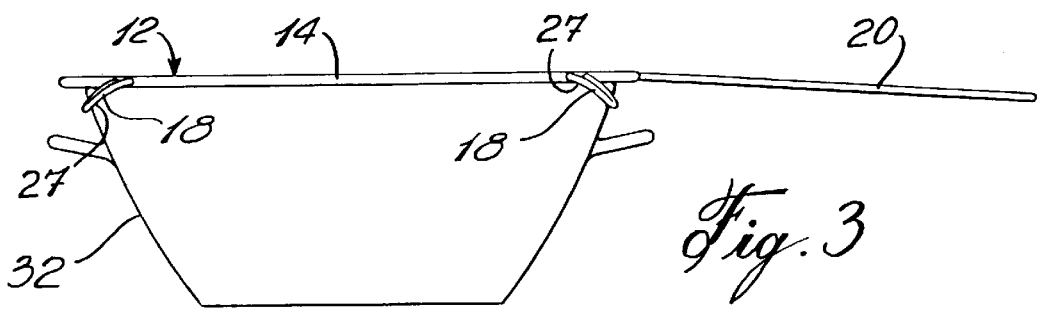
FIG. 3 shows the splatter screen of FIG. 1 resting loosely on a cooking vessel, in use; and, FIG. 4 is a side view of the splatter screen of FIG. 1 in free standing configuration on a flat working surface.

With further reference to FIG. 3, splatter screen 10 is shown resting loosely on an open cooking vessel 32. The curved inner faces 27 of support legs 18 permit restrained lateral movement of splatter screen 10 on cooking vessel 32. By reference to FIG. 3, it can be seen that the support legs 18 do not firmly engage the wall of the cooking vessel 32, but the curved inner faces 27 while permitting lateral movement also have a hooking action relative to the open rim of the vessel 32 to provide stability of location of the screen 10 on the vessel 32, and limit or restrain the lateral movement of screen 10 relative to vessel 32.

As can be more particularly seen in FIG. 4, when splatter screen 10 is removed from its working position on a cooking vessel 32, as shown in FIG. 3, and is placed on a kitchen working surface 34, the lower face 24 of the splatter screen 10 and more especially the wire mesh screen 16, is supported by the legs 18 and handle 20 in spaced apart relationship with the kitchen working surface 34, so as to be in non contacting relationship with such surface.

The splatter screen 10 can be fabricated employing conventional metal working procedures. In particular; the mesh screen 16 may be cut to shape and folded at its peripheral edge about an elongate wire. Support frame 14 may be formed from an elongate cylindrical tube having a continuous narrow slot adapted to receive the wire with the folded peripheral edge of the screen 16. The screen mounted on the wire is inserted into the slot and the ends of the cylindrical tube are secured together to form the circular frame with the screen entrapped therein, the tube then being subject clamping pressure to securely clamp the wire with the peripheral edge of the screen 16 therein. The legs 18 and handle 20 may be secured to frame 14 as by welding. In the particular embodiment shown, handle 20 has two arms each of which may be welded to an opposed end of the cylindrical tube which forms frame 14 thereby holding the ends of the tube together with one end telescoped slightly inside the other.

Variations of the specific and preferred embodiment described hereinbefore will be evident to persons in the art, and are considered to be within the scope of the invention which is more especially described by the claims hereinafter.

We claim:

1. A cover adapted to rest loosely atop a cooking vessel to prevent splashing of hot liquids from the vessel, while allowing passage of vapors from the vessel during cooking, comprising:
    a cover member having an upper face and a lower face and comprising a support frame and a generally planar wire mesh screen extending between opposed sides of said support frame,
    said mesh screen being adapted to extend across an opening of a cooking vessel to intercept hot liquid splashing outwardly therefrom, while allowing passage of vapor,
    a plurality of support legs in spaced apart relationship extending outwardly of said support frame and downwardly of said lower face,
    said support legs being adapted to support said cover member, in a free-standing configuration, on a flat supporting surface, with said lower face spaced from the flat supporting surface.

2. A cover according to claim 1 wherein said plurality of support legs comprises four legs, said legs being disposed in symmetrical manner about said cover member, in said spaced apart relationship.

3. A cover according to claim 1 wherein said support legs are arcuately curved to permit restrained lateral movement of the cover member relative to the opening of the cooking vessel.

4. A cover according to claim 1 wherein said frame is substantially circular.

5. A cover according to claim 1 further including a handle member extending outwardly of said support frame.

6. A cover according to claim 5 wherein said support legs have support surfaces adapted to engage the flat supporting surface in said free-standing configuration, said leg support surfaces lying in a common plane spaced from said wire mesh screen; and said handle member having an outer end having a handle support surface, said handle support surfaces lying in said common plane containing said leg support surfaces.

7. A cover according to claim 6 wherein said plurality of support legs comprises four legs, said legs being disposed in symmetrical manner about said cover member, in said spaced apart relationship.

8. A cover according to claim 7 wherein said handle is elongate, extending outwardly from said frame and being disposed at an acute angle to said common plane containing said leg support surfaces and said handle support surface.

9. A cover according to claim 8 wherein said support legs are arcuately curved to permit restrained lateral movement of the cover member relative to the opening of the cooking vessel.

10. A splatter screen for resting loosely atop a cooking vessel to prevent splashing of hot liquid fat from the cooking vessel while allowing escape of water vapor and steam from the working vessel during cooking, comprising:
    a screen member having an upper face and a lower face, in opposed relationship, said member having a circular support frame and a generally planar wire mesh screen extending between opposed sides of said support frame,
    said mesh screen being adapted to extend across an opening of a cooking vessel and having a mesh size to intercept hot liquid fat splashing outwardly therefrom, while allowing escape of water vapor and steam,
    a plurality of support legs in spaced apart relationship extending outwardly of said support frame and downwardly of said lower face,
    said support legs having leg support surfaces and said support legs being adapted to support said screen member, in a free-standing configuration, on a flat support surface, with said leg support surfaces contacting said flat supporting surface, and said lower face spaced from, and in non-contacting relationship with the flat support surface, and
    an elongate handle member extending outwardly from said frame, said handle member having an outer handle support surface,
    said handle support surface and said leg support surfaces lying in a common plane,
    said elongate handle member being disposed at an acute angle to said common plane.

* * * * *

UNITED STATES PATENT AND TRADEMARK OFFICE
CERTIFICATE OF CORRECTION

PATENT NO. : 5,992,675
DATED : November 30, 1999
INVENTOR(S) : Helen Kerr

It is certified that error appears in the above-identified patent and that said Letters Patent is hereby corrected as shown below:

Title page,
Insert - [73] Assignee: Browne & Co. Ltd./Cie Ltee, Markham, Ontario, Canada Signed and Sealed this Twenty-eighth Day of August, 2001

Attest:

*Nicholas P. Godici*

NICHOLAS P. GODICI
*Attesting Officer*     *Acting Director of the United States Patent and Trademark Office*